May 11, 1965 E. B. ARCHER 3,182,464
AUTOMATIC ICE MAKING DEVICES
Original Filed June 29, 1962 7 Sheets-Sheet 3
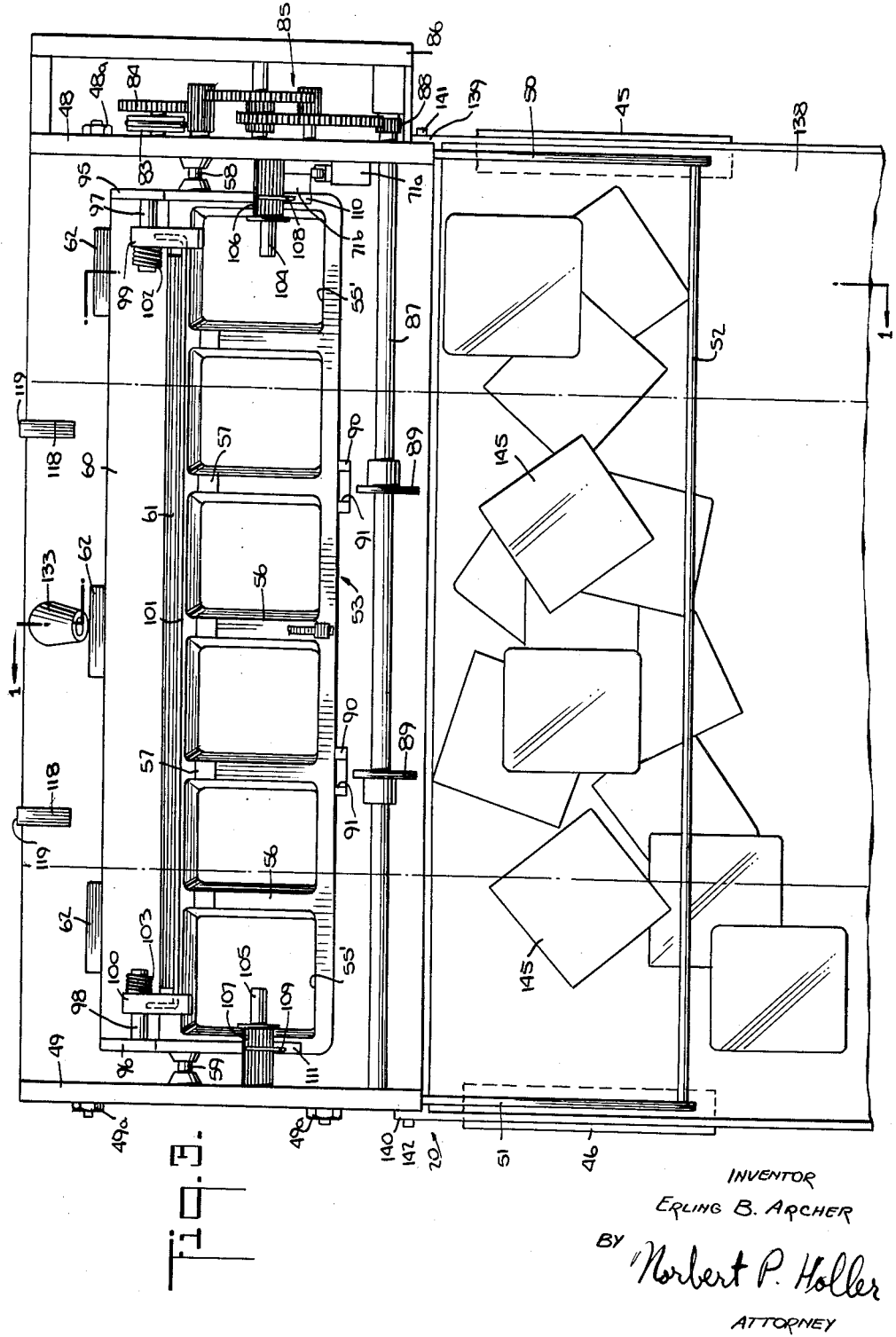
INVENTOR
ERLING B. ARCHER
BY Norbert P. Holler
ATTORNEY May 11, 1965  E. B. ARCHER  3,182,464
AUTOMATIC ICE MAKING DEVICES
Original Filed June 29, 1962  7 Sheets-Sheet 4
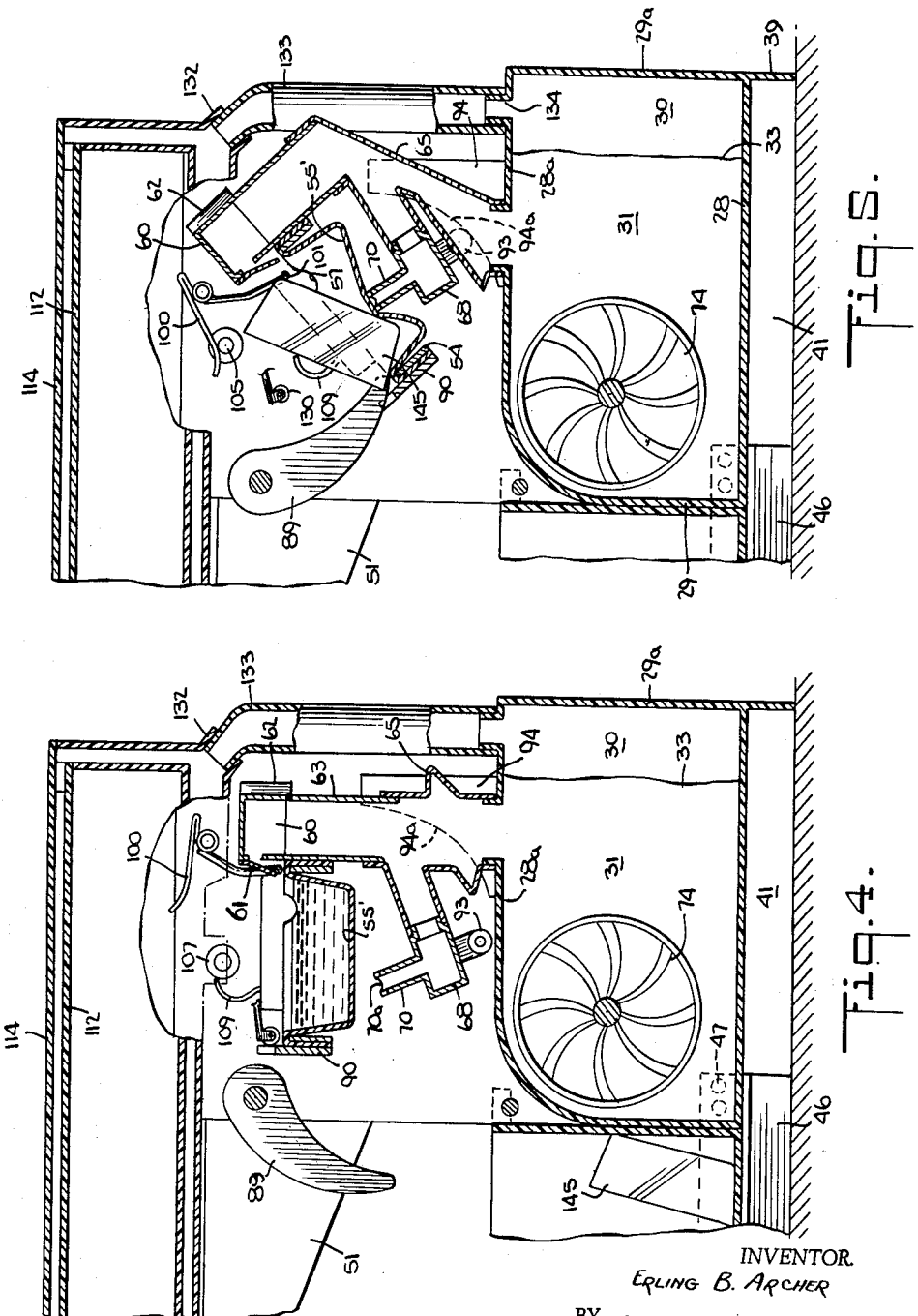
INVENTOR.
ERLING B. ARCHER
BY Norbert P. Holler
ATTORNEY

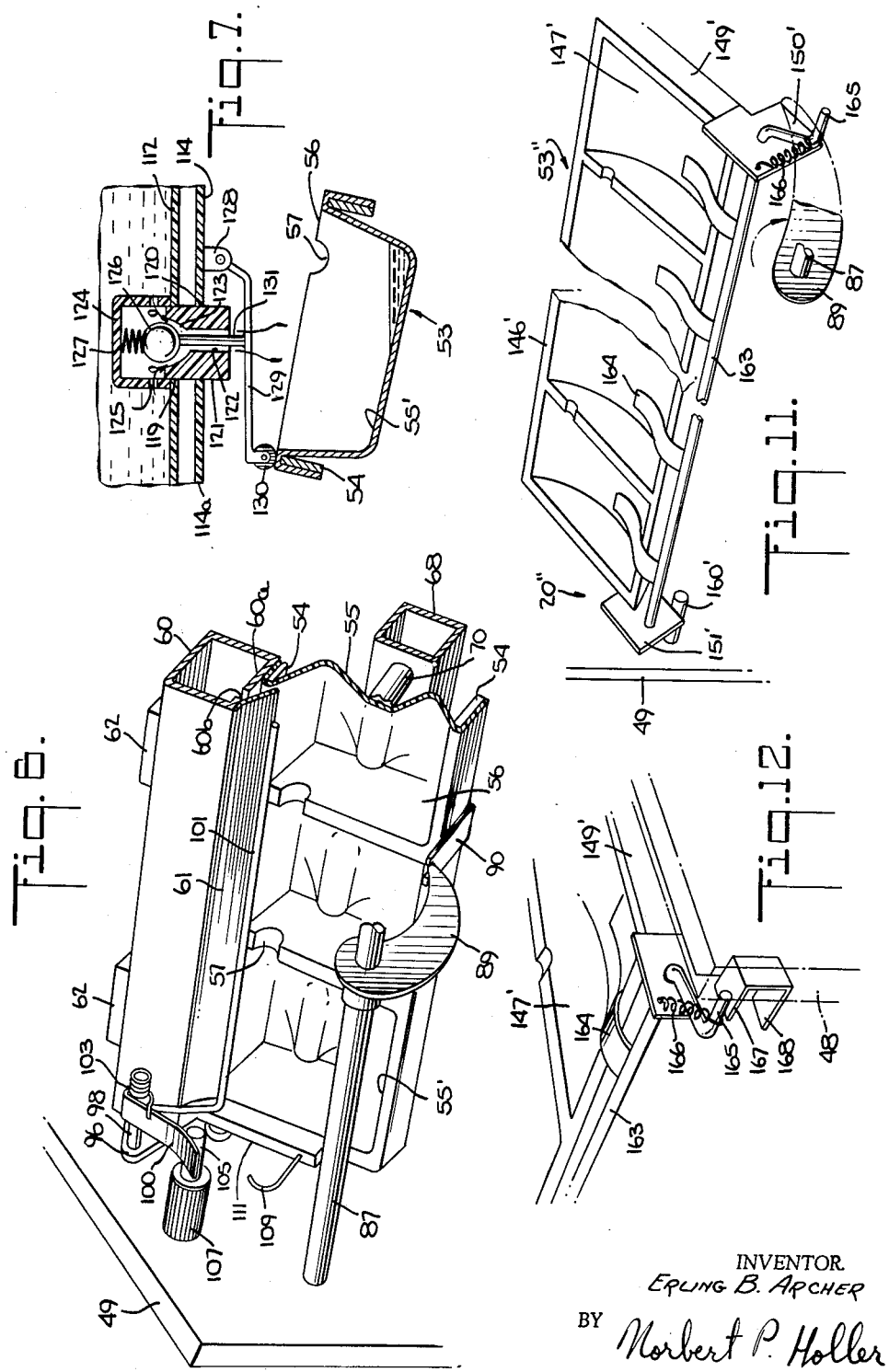

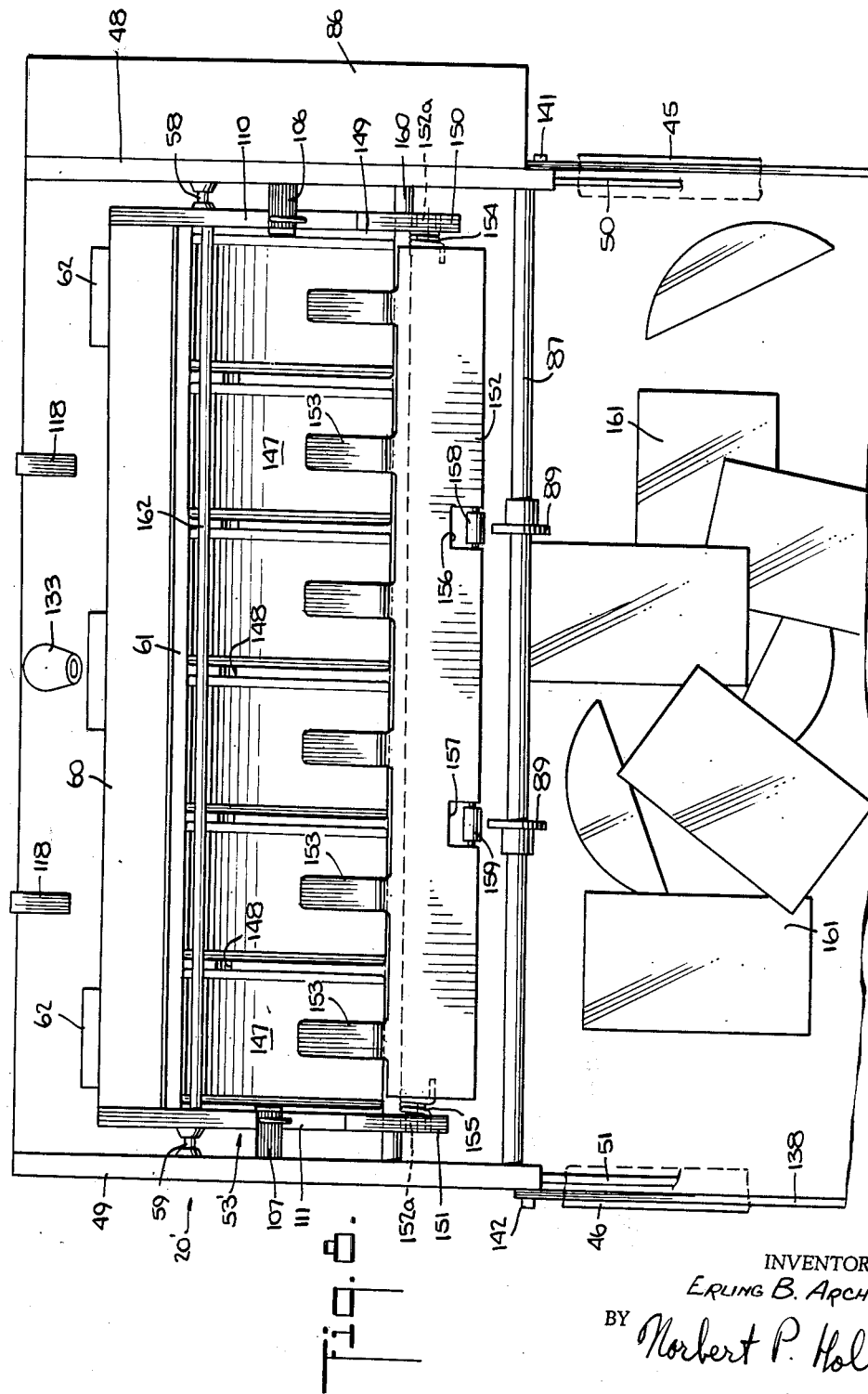

May 11, 1965 E. B. ARCHER 3,182,464
AUTOMATIC ICE MAKING DEVICES
Original Filed June 29, 1962 7 Sheets-Sheet 7
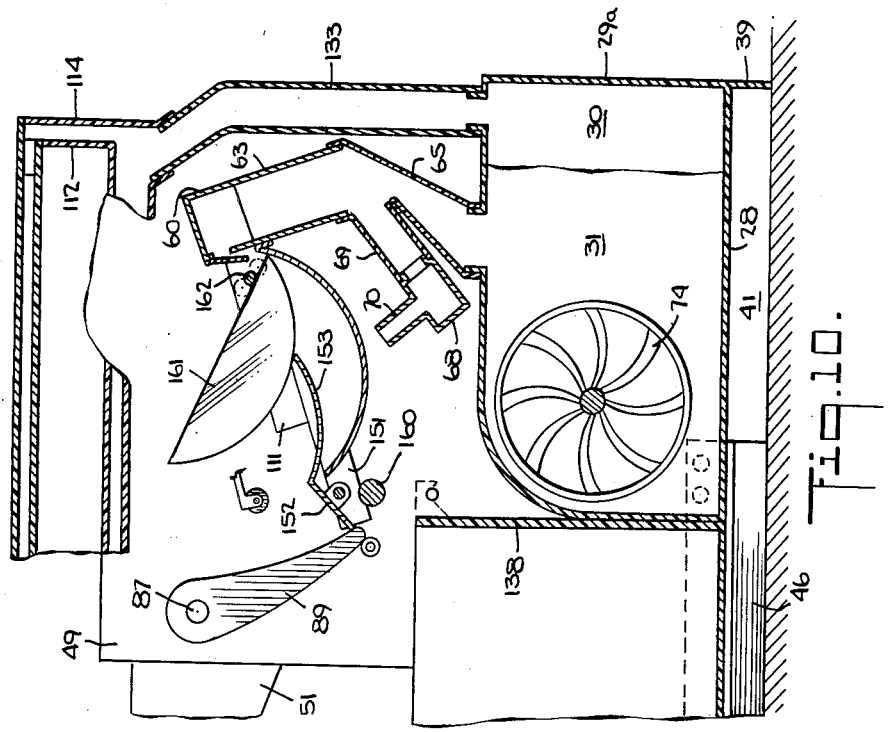
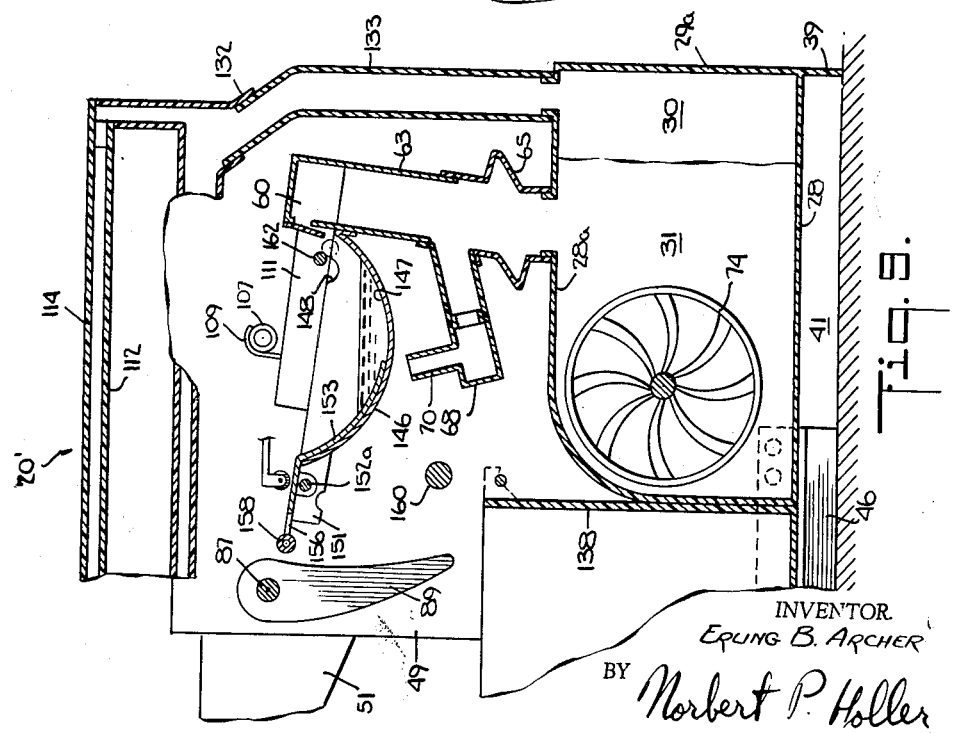
INVENTOR.
ERLING B. ARCHER
BY Norbert P. Holler
ATTORNEY

United States Patent Office 3,182,464
Patented May 11, 1965

3,182,464
AUTOMATIC ICE MAKING DEVICES
Erling B. Archer, 33—74 191st St., Flushing 58, N.Y.
Continuation of abandoned application Ser. No. 206,218, June 29, 1962. This application Dec. 14, 1962, Ser. No. 245,364
20 Claims. (Cl. 62—135)

This invention relates to automatic ice making devices, and in particular to apparatus for use in standard refrigerators for the purpose of freezing and harvesting small blocks of ice commonly referred to as ice cubes.

The instant application is a continuation of my copending application Serial No. 206,218, filed June 29, 1962, and now abandoned, which in turn is a continuation-in-part of my prior application Serial No. 854,138, filed November 19, 1959, and now U.S. Patent No. 3,048,986, issued August 14, 1962.

It is an object of the present invention to provide novel ice cube making devices which are substantially fully automatic in operation.

Another object of the present invention is to provide automatic ice cube making apparatus greatly simplified in construction and capable of being employed either as a built-in part or as a separate unit with all refrigerators having a freezer compartment normally maintained at a temperature below the freezing point of water.

Still another object of the present invention is the provision, in such an automatic ice cube freezing device, of means which are effective to reduce materially the time required for each freezing cycle.

It is also an object of the present invention to provide novel ice cube trays and means for ejecting frozen cubes therefrom.

A further object of the present invention is the provision in each such device, of a water supply tank, and of means for preventing any freezing of either the supply of water in the tank or the valve which controls the flow of water from the tank to the tray while the successive freezing cycles are in progress.

In my aforesaid patent I have disclosed an automatic ice cube freezing device comprising in essence the combination of a tray pivotally mounted at one longitudinal edge for movement between an upwardly slanted position, a horizontal position and a downwardly slanted position and having a body (defining the water-receiving pockets) made of resiliently flexible and deformable plastic material, with means for effecting a forced flow of cold air over the tray, and means for cyclically effecting the desired deformation of the tray body to cause the frozen cubes to be ejected from the said pockets. Associated with the tray are feed pipe means leading to the tray, valve means controlling the feed pipe means and responsive to the location of the tray so as to be open only when the tray is in its upwardly slanted position and closed when the tray is in its horizontal and downwardly slanted positions, and counterweight means adapted to move the tray to its upwardly slanted position whenever the tray is empty.

The instant application is directed to improvements in my prior arrangements and constructions. Among these improvements are cold air blowing facilities which greatly increase the rate of freezing of the water into cubes during each cycle, warm or tempered air blowing facilities which prevent any freezing of the water in the supply tank or of the valve controlling the flow of water from the tank into the tray, a common source of power for the two air blowing systems, and means for enhancing the efficacy of the cam-initiated ice cube ejection operations. As a further refinement, the invention contemplates the provision of a flexible and resiliently deformable metal tray to increase the freezing rate even more.

The foregoing and other objects, characteristics and advantages of the present invention will be more fully understood from the following detailed description thereof when read in conjunction with the accompanying drawings, in which:

FIG. 3 is a top plan view of the apparatus shown in FIG. 2, with the water supply tank being omitted;

FIG. 4 is a fragmentary, sectional, side elevational view of the apparatus similar to FIG. 1 and illustrates the tray or ice mold in its freezing position;

FIG. 5 is a view similar to FIG. 4 and illustrates the tray or ice mold during the ejection of ice cubes therefrom;

FIG. 6 is a fragmentary isometric top plan view of the tray or ice mold in the ejection stage shown in FIG. 5;

FIG. 7 is a sectional view of the details of the flow-controlling valve associated with the water supply tank for the apparatus;

FIG. 8 is a top plan view, similar to FIG. 3, of an ice making apparatus according to a second embodiment of the present invention;

FIG. 9 is a fragmentary, sectional, side elevational view of the apparatus shown in FIG. 8 during the filling of the tray and as seen from the right-hand side of the latter, certain parts being omitted;

FIG. 10 is a view similar to FIG. 9 and illustrates the said apparatus during the ejection of ice cubes from the tray;

FIG. 11 is a perspective, fragmentary illustration of the apparatus according to another embodiment of the present invention, and shows the tray during ejection of ice cubes therefrom; and FIG. 12 is a similar fragmentary view of certain structural details associated with the filling of the tray.

Figure 1:
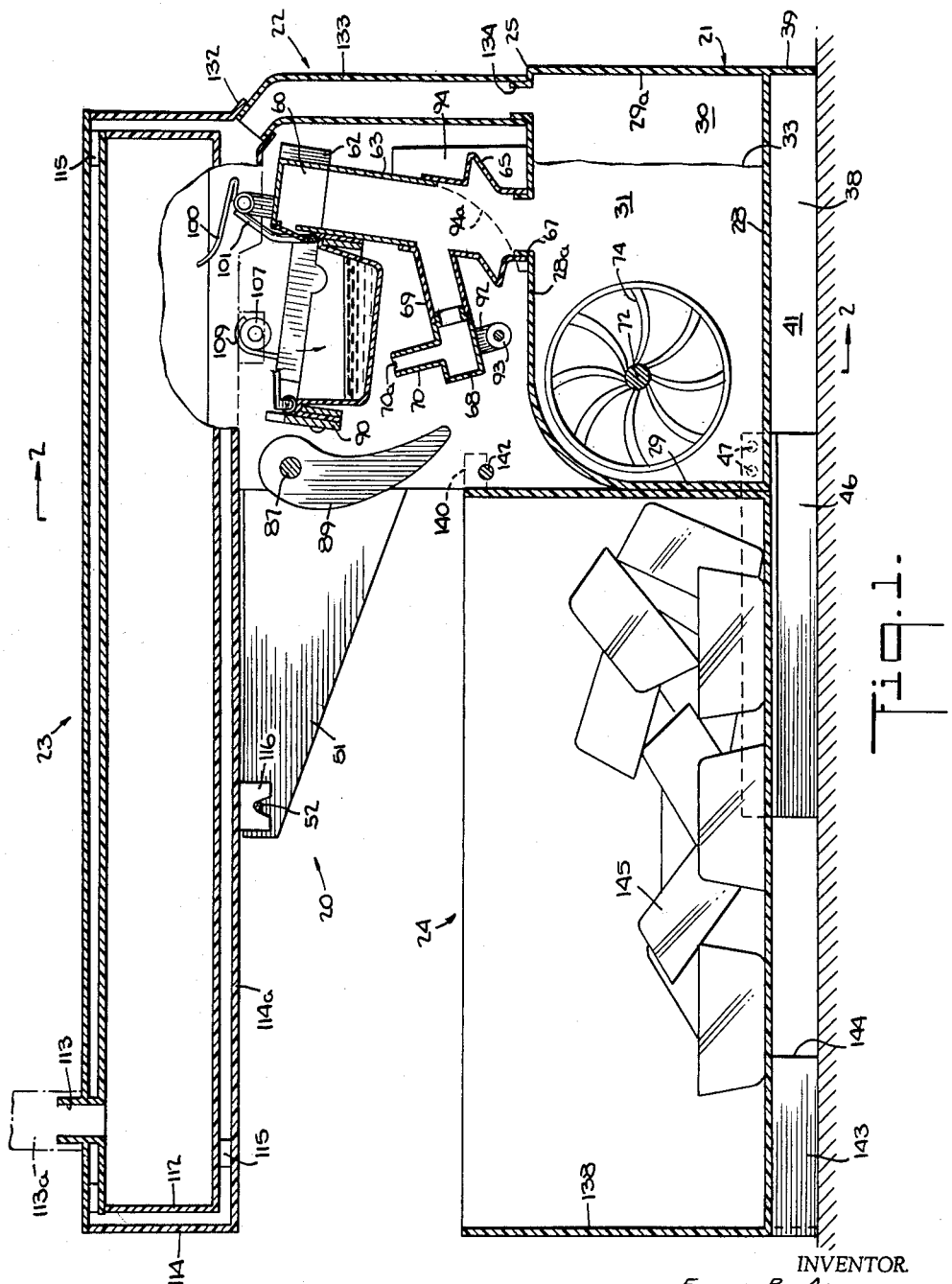
FIG. 1 is a side elevational view of an ice making apparatus according to one embodiment of the present invention, the view being from the right-hand side of the apparatus as shown in FIG. 2 and illustrating the tray during the filling thereof, certain parts being omitted and others shown in section for the sake of clarity.

Referring first to FIGS. 1 to 7, it will be seen that an ice making apparatus 20 constructed in accordance with one aspect of the present invention comprises a base structure 21, an ice cube freezing and ejecting mechanism 22 positioned above and supported by the base structure 21, a water supply structure 23 supported by the base structure above the mechanism 22, and an ice cube receiving and storage structure 24 disposed immediately in front of the base structure 21 and at a level below the ice cube freezing and ejecting mechanism 22.

Figure 2:
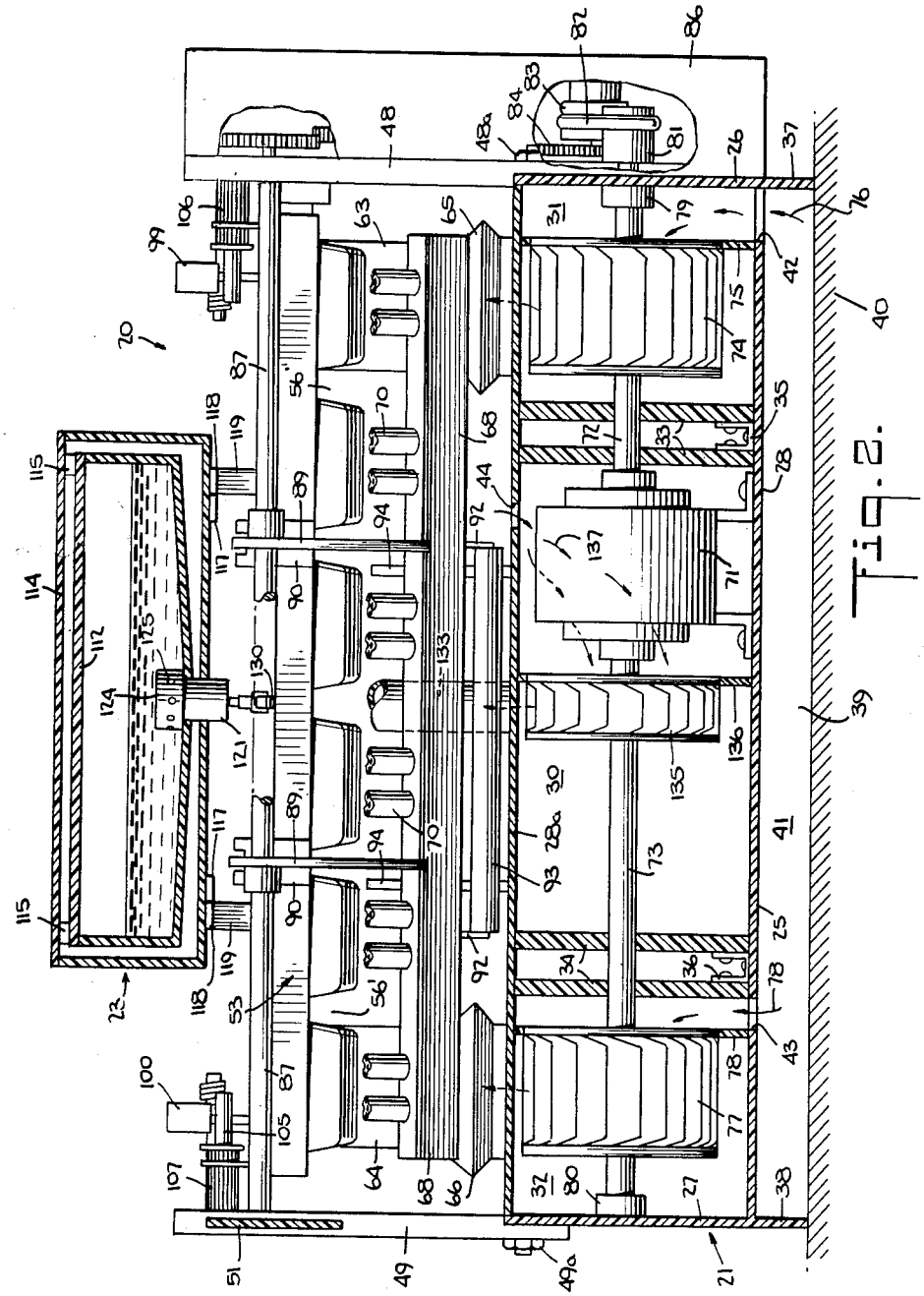
FIG. 2 is a sectional view taken along the line 2—2 in FIG. 1.

As clearly shown in FIGS. 1 and 2, the base structure 21 comprises an elongated, essentially closed housing 25 having vertical side walls 26 and 27, bottom and top walls 28 and 28a, and front and rear walls 29 and 29a. The interior of the housing is divided into three compartments 30, 31 and 32 by the provision of a pair of vertical, double-walled or otherwise insulated partitions 33 and 34 which are suitably secured in place, as by being bolted to the bottom wall 28 with the aid of U-shaped brackets 35 and 36. The side and rear walls of the housing 25 extend below the bottom wall 28 and define a pair of vertical side flanges 37 and 38 and a rear flange 39 extending therebetween which act in the manner of legs to support the housing on the floor 40 of the freezer compartment of the refrigerator, and also provide a space 41 between the freezer compartment floor 40 and the bottom wall 28 of the housing 25. The bottom wall 28 is provided in its opposite end regions with a pair of relatively large openings 42 and 43 establishing communication between the space 41 and the interiors of the chambers or compartments 31 and 32, and a relatively small opening 44 is provided in the top wall 28a in the central region thereof to establish communication between the freezer compartment and the chamber 30.

The side flanges 37 and 38 terminate somewhat short of the front housing wall 29. Extending frontwardly from the forwardmost edges of the flanges 37 and 38 are two substantially T-shaped angle members 45 and 46 (see FIG. 3), the legs of the T's extending horizontally toward one another and the cross bar portions being vertical and bolted to the side walls 26 and 27 of the housing as shown at 47 (see FIG. 1). The purpose and function of the angle members 45 and 46 will be more fully explained presently.

The base structure 21 further comprises a pair of vertical plates 48 and 49 which are bolted, as indicated at 48a and 49a to the outer surfaces of the housing side walls 26 and 27. Extending frontwardly from the plates 48 and 49 are brackets 50 and 51 between the forwardmost ends of which extends a horizontal cross bar 52.

The actual ice cube freezing operation of the apparatus is effected in an ice mold or tray 53 which comprises a rectangular, rigid, preferably metallic frame 54 and a molded plastic water-receiving body 55 supported centrally in the frame, the body being divided into a plurality of side-by-side sections or pockets 55' by means of a plurality of transverse partitions or dividers 56. Each of the dividers or partitions 56 is provided with a shallow cut-out or recess 57 to facilitate the distribution of water to all of the sections or pockets 55'. As best shown in FIGS. 1 to 3 and 7, the tray body 55 is so shaped that each of the pockets 55' is essentially trapezoidal in vertical cross-section (viewed both lengthwise and widthwise of the tray), the pockets 55' thus being somewhat wider at their open tops than at their bottoms.

Although the pockets are shown to be trapezoidal in both cross-sections, it is to be understood that they may have other shapes. Merely by way of example, the pockets may have a half-moon cross-section as seen widthwise of the tray. Such an arrangement may be of some advantage in the ultimate ejection of frozen cubes from the tray due to the greater slanting of the front walls of the pockets. For two equivalent size trays, of course, there would be slightly less ice per half-moon cube.

The tray 53 is journaled adjacent its rear edge at its opposite ends on the vertical plates 48 and 49 by means of suitable pivot pin arrangements 58 and 59 for pivotal movement about a horizontal axis. Connected to the rear edge of the tray frame 54 is an elongated hollow member 60 which extends the entire length of the tray and is preferably square or rectangular in cross-section for the sake of simplicity of manufacture, although it should be realized that the member 60 need not be so shaped. Adjacent the top edge of its front wall 60a, the hollow member 60 is provided either with an elongated slot 60b which also extends the entire length of the tray or with a pluraltiy of slots (not shown) each of which is coextensive with one or more of the pockets 55'. A flap 61 is secured to the uppermost edge of the wall 60a and overlies the slot 60b. At its rear wall the member 60 carries one or more counterweights 62 which act to move the tray 53 to an upwardly slanted position whenever the tray is empty.

The hollow member 60 communicates at its opposite ends with a pair of downwardly depending conduits 63 and 64 which at their lower ends have the form of a pair of flexible bellows 65 and 66 and communicate therethrough with the chambers 31 and 32, respectively, via openings 67 provided in the top wall 28a of the housing 25. Concurrently, the conduits 63 and 64 communicate with an elongated hollow member 68 of rectangular cross-section via a pair of branch conduits 69 extending frontwardly from the conduits 63 and 64. The member 68 is substantially coextensive with the tray 53 and carries a plurality of pairs of upwardly projecting short pipes 70, with each pair of such pipes being centered relative to a respective one of the tray pockets 55'.

Referring most particularly to FIG. 2, it will be seen that rigidly mounted in the chamber 30 of the housing 25 is a small electric motor 71 provided with a pair of output shafts 72 and 73. The shaft 72 extends through the partition 33 into the chamber 31 and there drivingly supports a rotary impeller 74. Surrounding the frame of the impeller at the open or intake side thereof is a substantially annular partition 75, preferably made of a suitable air-impervious, strong, synthetic plastic material, e.g. a resin, which is attached around its outermost periphery to the inner surfaces of the top, bottom, front and rear housing walls defining the chamber 31. The impeller 74, when being rotated, causes a forced flow of the air entering the chamber 31 through the opening 42 in the bottom wall 28, as indicated by the arrows 76, into the conduit 63 and the associated conduit 69 via the respective opening 67 and the bellows 65.

The second output shaft 73 of the motor 71 extends through the partition 34 into the chamber 32 where it supports a second impeller 77. As in the case of the impeller 74, the frame of the impeller 77 at the open side of the latter is also surrounded by a substantially annular partition 78 secured over its entire outer periphery, in the same manner as the partition 75, to the inner surfaces of the top, bottom, front and rear housing walls defining the chamber 32. Thus, the impeller 77 causes a forced flow of the air entering the chamber 32 through the opening 43 in the bottom wall 28, as indicated by the arrows 78, into the conduit 64 and the associated conduit 69 via the second opening 67 and the bellows 66.

The ends of the shafts 72 and 73 remote from the motor 71 are supported in respective bearings 79 and 80 mounted on the inner surfaces of the side walls 26 and 27 of the housing 25. The shaft 72 extends through the bearing 79 and the wall 26 and, exteriorly of the chamber 31, supports a small pulley 81 connected by drive belt 82 to a somewhat larger pulley 83. The latter is coaxially secured to a spur gear 84 which constitutes a part of a gear train 85 the details of which it is not deemed necessary to describe herein. The choice of gears making up the train 85 and also the selection of the various transmission ratios between the gears and between the pulleys 81 and 83 is controlled by the desired operating conditions sought to be attained, as will be more fully explained hereinafter. The entire transmission system constituted by the pulleys and the gear train is enclosed in a separate housing 86 secured to the outer surfaces of the housing wall 26 and the associated vertical plate 48.

Journaled at its opposite ends in the vertical plates 48 and 49 in front of the tray 53 and at a level slightly above the pivot axis of the latter is a rotary cross shaft 87 one end of which extends into the housing 86 and there carries the last gear or pinion 88 of the gear train 85. Secured to the cross shaft 87 in any suitable manner and at spaced location intermediate the ends thereof are cams 89 adapted to rotate with the shaft. Two rigid plates 90 are fixed to the front member of the tray frame 54 at respective locations corresponding to the locations of the cams 89, the plates 90 being provided with respective notches 91 in their top edges adapted to receive and provide slide contact or bearing surfaces for the leading edges of the cams 89.

The duct member 68 is provided with a pair of downwardly extending brackets 92 between which is journaled a roller 93. At a pair of spaced locations atop the housing wall 28a and behind the roller 93 are positioned two fixed abutment plates 94 the front edges 94a of which are curved concavely upwardly, as clearly shown in FIGS. 1, 4 and 5. The arrangement is such that when the tray 53 is pivoted downwardly under the action of the cams 89 when the latter bear against the plates 90, the combined structure composed of the conduits 63–64 and 69 pivots counter clockwise together with the tray (which is rendered feasible by the provision of the flexible and extensible bellows 65 and 66) so that the roller 93 is ultimately brought back into contact with the curved front edges of the abutment plates 94. Other aspects of the interaction between the roller 93 and the abutment plates 94 will be more fully explained hereinafter in connection with the description of the operation of the apparatus as a whole.

Affixed to the tray frame 54 at the opposite sides thereof and extending upwardly relative thereto are two small vertical brackets or plates 95 and 96 (see FIGS. 3 and 6) from which two pin 97 and 98 extend inwardly over the top of the duct member 60 and in axial alignment with one another. Rockably supported by the pins 97 and 98 are two small, flat arms 99 and 100 which extend essentially frontwardly over the tray and are connected to the opposite ends of a transverse bail 101 preferably constructed of a relatively thin, stiff wire. Respective torsion springs 102 and 103 mounted on the pins 97 and 98 serve to bias the arms 99 and 100 counterclockwise (as seen from the right in FIGS. 2 and 3) so as normally to maintain the bail 101 in its lowermost position adjacent the free edge of the flap 61 which overlies the slot (or slots) 60b in the duct member 60. Two axially aligned horizontal pins 104 and 105 are supported by the vertical plates 48 and 49 and extend inwardly over the tray across the paths of movement which the respective arms 99 and 100 follow when the tray is pivoted downwardly by the cams 89. As best shown in FIGS. 1 and 4 to 6, the arm 99 and 100 are curved upwardly at their front ends so as to ensure that their lower surfaces engage the pins 104 and 105. When the arms ride up on these pins, the bail 98 is swung away from its rest position adjacent the flap 61 and upwardly over the rear edges of the tray pockets 55'.

The pins 104 and 105 also support a pair of freely rotatable, longitudinally grooved rollers 106 and 107. Two small, hook-ended wire spring members 108 and 109 extend upwardly from a pair of brackets 110 and 111 mounted atop the opposite end members of the tray frame 54. The heights of these spring members are such that their hooks curve around the rollers 106 and 107 when the tray is in its upwardly slanted position (FIGS. 1 and 2), and that the free ends of the hooks are engaged in respective grooves of the rollers when the tray is in its horizontal position (FIG. 4). The function of this arrangement will also be referred to more fully hereinafter.

The water supply structure 23 for the apparatus according to the instant invention comprises a water supply tank 112 provided with an inlet nipple 113 in its top wall for attachment of a supply hose 113a or the like, as shown in phantom outline in FIG. 1. The tank 112 is positioned within an outer enclosure 114 with the aid of suitable spacer blocks 115 or the like. Extending downwardly from the lower surface of the bottom wall 114a of the outer enclosure for the tank are two notched lugs or ears 116 which are adapted to engage and rest on the cross bar 52 extending between the brackets 50 and 51 supported by the vertical plates 48 and 49. At the rear end of the bottom wall 114a of the supply tank enclosure 114 a pair of parallel guide bars 117 are provided in position to engage a corresponding pair of horizontal supporting arms 118 at the inner edges of the latter, these arms being integral with respective brackets 119 rigidly mounted on the base of the apparatus at the rear thereof (see FIG. 2). The arms 118 are disposed at a level somewhat above the horizontal position of the tray 53. In this manner, the supply tank structure 23 is always properly positioned relative to the remainder of the apparatus.

Both the supply tank 112 and the outer enclosure 114 therefor are provided with vertically aligned openings 119 and 120 in the bottoms thereof (see FIG. 7) adjacent the rear region of the structure. A bushing 121 having a vertical bore 122 extending axially therethrough and provided with a hemispherical seat 123 in its top surface is fixedly mounted in these openings so as to extend into the interior of the tank 112. Threaded or otherwise secured to the top end of the bushing 121 is a cap member 124 which is positioned interiorly of the tank 112 and provided with a plurality of peripherally spaced apertures 125. A ball valve 126 is disposed within the confines of the cap member 124 atop the bushing 121 and is normally seated in the recess 123, so as to close the bore 122, under the influence of a compression spring 127 interposed between the ball and the top of the cap member 124.

Also affixed to the bottom wall 114a of the outer supply tank enclosure 114 adjacent the valve bushing 121 is a small, downwardly depending lug 128 to which one end of a lever 129 is connected for pivotal movement about a horizontal axis. The other end of the lever 129 carries a small, freely rotatable roller 130, and the length of the lever is such that when the tray 53 is in its upwardly slanted position, the front member of the tray frame 54 engages the roller 130 and displaces the lever upwardly into the position shown in FIG. 7. Suitably affixed to the lever 129 intermediate the ends thereof and extending upwardly therefrom is a valve actuator rod or pin 131 which extends into the bore 122 in the bushing 121. The length of the pin 131 is such that when the lever 129 is raised by the tray, the pin engages the ball 126 and lifts the same off its seat so as to open the valve bore. The cross-sectional width of the bore 122 is suitably chosen to ensure that it does not interfere with the slight canting of the pin during the up and down movements of the lever 129.

The outer enclosure 114 for the supply tank 112 is further provided at its rear edge with a nipple 132 to which is connected one end of a flexible hose or tube 133. The other end of the tube 133 is connected to an upwardly extending nipple 134 which is provided in the top wall 28a of the housing 25 and communicates with the interior of the central motor-enclosing chamber 30. In this chamber is positioned, in addition to the motor 71, an impeller 135 (see FIG. 2) which is mounted on the shaft 73 and the open or intake side of which faces the motor 71. As in the case of the impellers 74 and 77, a partition 136 is provided around the frame of the impeller at the open side thereof, the peripheral edge of the partition 136 being secured to the inner surfaces of the top, bottom, front and rear walls of the housing 25. By virtue of this arrangement, whenever the motor is in operation, air entering the chamber 30 from the freezer compartment through the opening 44 in the top housing wall 28a, as indicated by the arrows 137, flows over the motor 71 and is forced by the impeller 135 to flow through the tube 133 into the space between the supply tank 112 and the outer enclosure 114. Since such air is warmed or tempered by the heat given off by the motor, it serves to prevent any freezing of the water in the supply tank and also ensures that no freezing of the valve can occur. For the purpose of controlling the operation of the motor, a switch 71a (see FIG. 3) is mounted on the vertical plate 48 of the base structure 21 in position to have its actuating lever engaged by a projecting member 71b carried by the tray frame 54. The arrangement is such that the switch is so engaged, and thereby opened to stop the motor 71, only when the tray is moved to its upwardly slanted position during filling of the tray.

It will be understood, of course, that the size of the motor is such that it does not give off too much heat even during prolonged periods of operation. The heat is sufficient to raise the temperature of the air flowing through the chamber 30 about 15 to 20 degrees above the temperature of the freezer compartment, and the action of the impeller 135 ensures that substantially no warm air will escape from the chamber 30 through the opening 44. This opening is preferably located out of alignment with the motor 71, so that even the radiation of heat through the opening is effectively inhibited.

The ice cube receiving and storage structure 24 according to the present invention comprises an open-topped bin or like receptacle 138, preferably of rectangular cross-section. At its rear edge, the bin 138 is provided with a pair of horizontally extending lugs or hooks 139 and 140 designed to fit over a pair of horizontal pins 141 and 142 projecting from the outer faces of the vertical base structure plates 48 and 49. In the front region of the bin 138, the bottom wall thereof is provided with a downwardly depending flange 143 which extends entirely along the front wall of the bin and a short distance rearwardly along each of the side walls. When the bin is hooked onto the pins 141 and 142, the rear end region of the bin rests on the supporting tracks defined by the horizontal webs of the T-shaped members 45 and 46 extending frontwardly from the housing 25. Thus, there are provided at the opposite sides of the bin 138 a pair of elongated openings 144 (see FIG. 1) defined between the rearwardmost edges of the bin flange 143 and the frontwardmost edges of the members 45 and 46. These openings afford access for air from the freezer compartment into the space 41 defined between the freezer compartment floor 40 and the bottom wall 28 of the housing 25.

The operation of the apparatus according to this embodiment of the invention will best be understood from a description of one complete freezing cycle. As a starting point it is assumed that an ejection of a batch of frozen cubes 145 into the bin 138 has just been completed and that, as a consequence, the cams 89 are in the position illustrated in FIGS. 1 and 3. The tray 53, having been emptied, has been returned to its upwardly slanted position by the action of the counterweights 62, at which time the wire retaining hooks 108 and 109 lie over the grooved rollers 106 and 107. At the same time, the switch 71a is engaged and opened by the member 71b secured to the tray frame 54 so as to stop the motor 71.

When the tray frame 54 comes up, it engages the roller 130 and displaces the lever 129 and the pin 131 carried thereby upwardly so as to move the valve 126 off its seat 123, permitting water to flow from the supply tank 112 into the tray body 55 in which the water is ultimately distributed to all the pockets 55' by virtue of the presence of the recesses 57 in the partitions 56. During this filling action, the tray remains in its upwardly slanted position, despite the accumulation of water therein, through the action of the hooks 108 and 109 which assist the counterweights 62 in holding the tray so slanted. The purpose of this arrangement is, of course, to ensure that the tray is filled to capacity, since in the absence of the hooks the entering water would progressively overcome the force of the counterweights and the resultant progressive lowering of the tray would concomitantly decrease the flow of water into the tray. The physical characteristics of the hooks 108 and 109 are so chosen that only when the tray is filled with the predetermined quantity of water sufficient to provide the desired ice cubes, is the water able to overcome the retaining action of the counterweights and the hooks to move the tray through a downward arc.

As the tray reaches its horizontal position, which occurs with a type of snap action, the roller 130 is disengaged from the tray frame 54 and permitted to drop, enabling the spring 127 to press the ball valve 126 against its seat and immediately stop the flow of water from the supply tank. The downward movement of the tray does not continue beyond the horizontal position since the hooks 108 and 109 now engage in respective grooves of the rollers 106 and 107 and thereby act to retain the tray in the horizontal position (see FIG. 4).

The downward movement of the tray from its upwardly slanted position also disengages the member 71b from the switch 71a, whereby the motor circuit is closed. With the motor 71 running, the impellers 74, 77 and 135 begin to rotate. As a result, the coldest air in the freezer compartment, which is that air found along the floor of the compartment, flows through the openings 144 into the space 41 under the housing 25 and thence through the openings 42 and 43 into the chambers 31 and 32, from where it is blown by the impellers 74 and 77 into the conduits 63–64 and 69. A part of this cold air thus flows into the duct member 60 and from the latter through the slot (or slots) 60b under the flap 61 directly onto and over the top surface of the water collected in the various tray pockets 55'. At the same time, the remainder of this cold air flows through the conduits 69 into the duct member 68 from which it issues via the pipes 70 to impinge directly against the bottom walls of the tray pockets and also to flow about the latter against the side walls thereof in the spaces 56' (see FIG. 2) between adjacent pockets and under the dividers 56. Since the water in the tray is thus subjected to streams of extremely cold air from all points, in addition to being located in the generally cold atmosphere of the freezer compartment, the water is frozen at an extremely rapid rate. Experiments have shown that in an apparatus of this type the water will be completely frozen in a period of less than one hour, after about 45 to 60 minutes, whereas in the conventional ice cube making devices employing ordinary cooling methods, e.g. contact with a cold surface, it generally takes about two hours to freeze one batch of ice cubes.

As hereinbefore mentioned, concurrently with the creation of a forced flow of extremely cold air over, under and around the tray body 55, a forced flow of somewhat warmer air, resulting from the entry of air from the upper regions of the freezer compartment into the motor chamber 30 via the opening 44, is created through the tube 133 into the space surrounding the water supply tank and over the valve bushing 121. This flow of warm air continues as long as the motor is operating, i.e. substantially throughout the entire freezing cycle except for the fraction thereof taken up by the filling operation, and thus no freezing of water in the tank or the valve can occur.

The motor 71 also drives the gear train 85 through the pulleys 81 and 83 and the drive belt 82 to rotate the cross shaft 87 and therewith the cams 89. The transmission characteristics of the gear train are so selected that the cams rotate from the position illustrated in FIG. 1 through the position illustrated in FIG. 4 and to a position in which their leading (now lowermost) edges contact the upper edges of the bearing plates 90 fixed to the tray frame 54 in less time than it takes to completely freeze the water in the tray, preferably in about the time the water is frozen into an ice shell enclosing only a relatively small quantity of still uncongealed water. This stage will have been reached after approximately three-fourths of the cycle has elapsed.

As the rotation of the cams continues past this point, the tray 53 is slowly forced angularly downwardly about its axis 58–59. As a part of this action, of course, the conduits 63–64 and 69, which are flexible to a certain extent, are also drawn counterclockwise (as seen in FIGS. 1, 4 and 5) about the pivot axis of the tray. During the initial part of this angular movement, the freezing of the water is completed, but the tray pockets are not as yet deformed. When the roller 93 reaches the abutment plates 94 and begins to ride up along the curved edges 94a of the latter, however, due to the relative motion between the tray and the pipes 70, the tray catches up with and is forced against these pipes which now also constitute abutments for the tray. The flow of air through the pipes 70 is not blocked at any time because their upper edges are notched or scalloped, as shown at 70a, to permit lateral escape of the air even when the bottom walls of the pockets 55' cover the mouths of the pipes 70.

The further rotation of the cams 89 ultimately brings them to the positions illustrated in FIGS. 5 and 6. During the corresponding final part of the angular movement of the tray and associated elements, the pipes 70 act to deflect the bottom walls of the pockets 55′ upwardly, causing the ice cubes 145 to be raised out of and ejected from the said pockets over the front edge of the tray frame 54, as shown in FIG. 5, and into the storage bin 138. At the same time, for the purpose of assisting in the ejection operation, in the last stages of the counter-clockwise pivotal movement of the tray 53, the arms 99 and 100 begin to ride up over the pins 104 and 105, causing the bail 101 to be swung in a clockwise direction away from the duct member 60. This permits the bail to engage the rear edges of the ice cubes 145 so as to push the latter up and over the front edge of the tray frame.

When the cams have moved fully past the bearing plates 90, the counterweights become active to return the now empty tray and associated parts to the position illustrated in FIGS. 1 and 7, the motor and impellers are stopped, and the entire cycle is now ready to start over again.

The cycles of filling, freezing and ejecting continue until the tank 112 is empty. In accordance with the present invention, the tank holds enough water to provide a quantity of ice cubes 145 which is just sufficient to fill the bin 138. Thus, when the bin becomes full, the tank will be empty and no more ice cubes will be formed. Overflowing of the bin is, therefore, impossible, and no quantity-responsive switch need be provided as in heretofore known ice making devices. Moreover, as long as the tank remains empty, the motor 71 will not operate since the tray 53 will be located in its upwardly slanted position. When the supply of cubes is exhausted (or nears exhaustion), the tank 112–114 is simply lifted off the bracket arms 118 and the cross bar 52, taken over to the nearest water faucet and refilled. During this operation, the valve 121–126 is closed so that no water can escape. As soon as the tank is replaced onto the supporting means therefor, the roller 130 will be engaged by the tray frame 54, the valve will open, and the hereinbefore described cycles will recommence.

Power for the motor 71 is preferably obtained by connecting the same and the switch 71a directly into the main power circuit for the refrigerator. Alternatively, however, a small dry cell or storage battery system for the motor may be provided as a part of the apparatus 20, eliminating the necessity for any exterior electrical connections and requiring only periodic replacement or recharging of the batteries.

It is also possible to eliminate the water supply tank structure altogether. In such an arrangement, the apparatus 20 is supplied with a length of tubing which can be connected to a source of supply of water located outside the refrigerator, as for example a water main into which the tubing is connected so as to receive a continuous flow of water. The valve would then be incorporated in this tubing, with the latter, the valve and the valve-actuating means being stationarily supported above the tray in any suitable manner. This type of arrangement enables the periodic refilling of the tank to be avoided. The warm air conduit 133 would be extended to surround the filling tube and the valve and be provided with an opening to permit the latter to discharge into the tray. For obvious reasons, of course, the warm air duct would also have to be extended to permit removal of the warm air from the freezer compartment.

For the sake of ease of manufacture, the main structural parts of the apparatus 20 herein described, e.g. the housing 25 of the base structure 21, the water supply tank structure 23, the duct members 60 and 68–70, the housing 86 for the transmission system, the vertical mounting plates 48 and 49, the bin 138, and the various mounting flanges are preferably made of materials which are light in weight and yet sufficiently sturdy and capable of withstanding low temperatures, as well as inexpensive. Merely by way of example, these parts of the apparatus may be made of polystyrene, "Bakelite" and other similar resinous materials, molded to shape in any suitable number of sections. The tray body 55 and also the various conduits 63–65, 64–66, 69 and 133 are preferably made of more flexible and resiliently deformable plastic materials such as polyethylene, polyvinyl chloride or the like, the only requirement with respect to the tray body being that it must be made of a material incapable of imparting any taste to the ice cubes being formed. Only the motor 71, the impellers 74, 77 and 135 (which may be of any desired commercially available types), the cams 89, the bearing plates 90, and the tray frame 54 are made of metal. It will be appreciated, of course, that the impellers could be replaced by small suction fans or other air-flow generating means.

It is also possible to employ auxiliary heating means in conjunction with the water supply tank and the valve, for example, one or two small flashlight bulbs or the like (not shown) supported by the tank 112 or the enclosure 114 adjacent the valve and connected into the motor circuit via the switch 71a. In such a case, the warm air duct 133 and the associated impeller 135 could even be eliminated. It will further be recognized that irrespective of the type of freeze-inhibiting or warming means employed, the tank structure 23 need not be double-walled throughout, since the provision of the bottom space would suffice if the remaining walls of the tank were suitably insulated.

In the apparatus 20′ according to the embodiment of the present invention illustrated in FIGS. 8, 9 and 10 (wherein parts identical with those shown in FIGS. 1 to 7 are designated by like reference numerals), the tray or ice mold 53′ comprises a body 146 made of relatively thin resilient metal rather than plastic. The pockets 147 formed in the tray body 146 are interconnected by means of small flow channels 148 through which the distribution of water is effected. The tray frame 149 includes a pair of lateral frontwardly extending arms 150 and 151 between which is disposed a plate 152 mounted by means of pins 152a for pivotal movement about an axis parallel to the axis 58–59. The plate 152 is provided with a number of integral transverse fingers 153 each of which extends into a respective one of the tray pockets 147, the fingers having essentially the same curvature as the front walls of these pockets. Torsion springs 154 and 155 associated with the journals or pins 152a at the opposite ends of the plate 152 bias the latter clockwise (as seen from the right in FIG. 8) so as to maintain the fingers 153 in engagement with the inner surfaces of the pockets, as clearly shown in FIG. 9. At its front edge, the plate 152 is provided with a pair of small recesses 156 and 157 in which are rotatably journaled a pair of rollers 158 and 159. The recesses 156 and 157 are positioned directly opposite the cams 89 on the cross shaft 87, the rollers 158 and 159 constituting the elements against which the cams are adapted to bear when being rotated during the various freezing cycles. Arranged below the tray 53′ and extending between the vertical mounting plates 48 and 49 is a rigid abutment bar 160 which is positioned in the path of movement of the arms 150 and 151 of the tray frame 149.

In the operation of the apparatus 20′ according to this embodiment of the invention, as the cams 89 are rotated and brought into engagement with the rollers 158 and 159, the entire tray structure, including both the tray frame 149 and the plate 152 are pivoted jointly about the axis 58–59 inasmuch as the fingers 153 are effectively frozen to the tray body by the ice cubes 161 located in the pockets 147. During this initial stage of the tray movement, therefore, no relative motion takes place between the plate 152 and the tray frame 149. After a certain interval of time, however, the arms 150 and 151 of the tray frame engage the abutment bar 160 with the result that no further angular movement of the tray frame can take place. The continued rotation of the cams now forces the plate 152 to rock counterclockwise (as seen from the right in FIG. 8) relative to the tray frame. This raises the fingers 153 out of the pockets 147 of the tray with sufficient force to strip the ice cubes 161 from the inner surfaces of the tray pockets and to push them over the front edge of the tray. The cubes thus fall over the plate 152 into the bin 138.

In order to assist in the separation of the ice cubes 161 from the fingers 153 themselves, there is provided a cross bar 162 which is supported by and extends between the brackets 110 and 111 (which are secured to the upper surfaces of the tray frame end members) at a location just in front of the rearwardmost ends of the tray pockets 147. As clearly shown in FIG. 10, this cross bar 162 serves as an abutment against which the rear ends of the ice cubes come during the ejection operation so that, as the fingers 153 continue to rise, the cubes will be effectively rocked clockwise (as seen in FIG. 10) about the end edges of the fingers.

As will be readily understood, the shapes of the tray pockets 147 need not be precisely as shown in FIGS. 8 to 10, although a configuration providing a longitudinal half-moon cross-section is preferred. Thus, the pockets could be trapezoidal as in FIGS. 1 to 7, or either circular or pear-shaped in horizontal cross-section. The tray of the apparatus 20' provides an additional advantage in that, being made of metal, it permits a more rapid freezing of the water by the cold air incident on the tray from below via the pipes 70. Thus, freezing cycles even shorter than those attainable with the plastic tray apparatus 20 of FIGS. 1 to 7 may be achieved.

In accordance with still another aspect of the present invention, the apparatus, designated 20'' and illustrated schematically in FIGS. 11 and 12, makes use of a tray 53'' consisting of a resiliently deformable metal body 146' mounted in a frame 149' which is constructed so as to be slightly twistable about its longitudinal axis. A shaft or rod 163 is rotatably supported by a pair of arms 150' and 151' affixed to the tray frame. The shaft 163 is provided with a plurality of transverse fingers 164 extending into the various tray pockets 147' and at one end extends through the arm 150' of the tray frame 149', terminating in an off-set, crank-like arm 165. In this form of the apparatus, the shaft 87 supports only one cam 89 at a location in which it will come into engagement with the arm 165. In lieu of the full-length abutment bar 160 shown in FIG. 8, a short abutment bar 160', supported at one end only by the vertical mounting plate 49 and extending below and just past the arm 151', is employed. The shaft 163 is biased so as to maintain the fingers 164 against the bottoms of the tray pockets 147' by means of a small tension spring 166 connected between the tray frame arm 150' and the shaft arm 165. For the sake of clarity, the ducts 60 and 68 and their associated structures are not shown in FIGS. 11 and 12.

In operation, when the tray is in its upwardly slanted position as shown in FIG. 12, the arm 165 is in contact with the upper surface of a small, stiff but flexible rubber flap 167 which is supported by the vertical mounting plate 48 and extends horizontally therefrom. The flap 167 serves as a stop to retain the tray in the upwardly slanted position until the pockets are filled with water to the desired extent, the flap thus coacting with the counterweights in the same manner as the wire hooks 108 and 109 do when looped over the rollers 106 and 107 of the previously described embodiments of this invention. When the tray is filled, it overcomes the retaining action of the flap 167 and pivots downwardly to its horizontal position in which the arm 165 comes to rest against a second small, stiff but flexible rubber flap 168 also supported by the vertical mounting plate 48. The flap 168 thus functions in the same manner as the hooks 108 and 109 when the latter engage in the grooves of the rollers 106 and 107 as shown in FIG. 4.

As the cam rotates and reaches the arm 165, it causes the entire tray to rock about its pivot axis since the fingers 164 are still frozen fast to the pockets 147' of the tray body 146'. When the arm 151' reaches the cross bar 160' however, the left-hand end of the tray (see FIG. 11) is brought to a halt while the right-hand end of the tray continues to move under the force of the cam. This causes the tray to be twisted slightly about its longitudinal axis, which loosens the cubes in the pockets by breaking the bonds between the ice and the inner surfaces of the pockets, as well as between the ice and the fingers 164. Concurrently, the fingers are rotated up and out of the tray so as to propel the frozen cubes out of the pockets and into the bin.

The apparatus 20'' thus is seen to be possessed of the same basic advantages as the apparatus 20', being, for example, equally conducive to extremely rapid freezing of the water due to the high heat transfer capacity of the metal tray body. In addition, the apparatus 20'' is somewhat more simplified and, consequently, less expensive to produce than the apparatus 20' due to the elimination of the plate 152 and the replacement thereof by the rod or shaft 163 which requires only a single cam, a single finger-biasing spring and a short abutment bar.

Further, both the "metal tray" apparatuses 20' and 20'' afford another advantage in common with the "plastic tray" apparatus 20, to wit the ejection of ice cubes in a completely dry state so that no cohesion of cubes in the bin can occur. No heat for loosening the cubes from the tray pockets is required, nor is it necessary to provide means for drying the cubes before harvesting. The cubes can simply remain in the bin until they are to be used, and thus they will not melt or stick together. The removability of the bin also makes it possible to avoid handling the ice cubes themselves while transferring them to an ice bucket or the like, thereby saving the user both the bother and the mess normally associated with cracking cubes out of a conventional tray.

Another great advantage of the apparatus according to the present invention, in any of its forms, is the compactness of the entire unit which enables it to be placed either lengthwise or crosswise in the freezer compartment without occupying more than a small fraction of the interior space of the freezer compartment. Depending on the size of the refrigerator, therefore, both the water supply tank and the bin (which are removable and replaceable items) can be made as large or as small as desired to provide for greater or lesser accumulations of ice cubes.

It will be understood that the foregoing description of preferred embodiments of the apparatus according to the present invention is for the purpose of illustration only and that the disclosed structures and structural arrangements are subject to a number of changes and variations none of which involves any departure from the spirit and scope of the present invention as set forth in the appended claims.

Having thus described my invention, what I claim and desire to secure by Letters Patent is:

1. In an automatic ice cube freezing and harvesting apparatus adapted to be positioned in the freezer compartment of a refrigerator; a base structure defining a plurality of chambers, ice mold means adapted to contain water to be frozen into ice cubes, means mounting said ice mold means on said base structure for pivotal movement between an upwardly slanted position, a substantially horizontal position and a downwardly slanted position, counterweight means connected with said ice mold means and operable to move said ice mold means when empty to said upwardly slanted position, duct means terminating in close proximity to said ice mold means above and below the latter, blower means located in at least one of said chambers for effecting a forced flow of cold air from the bottom of said freezer compartment through said duct means simultaneously against the top and bottom of said ice mold means for freezing the water in said ice mold means at an accelerated rate, means operable to releasably retain said ice mold means when filled in said horizontal position thereof until rendered ineffective so as to permit movement of said ice mold means to said downwardly slanted position thereof, supply means for the water to be frozen, valve means controlling the flow of water between said supply means and said ice mold means and responsive to the location of the latter so as to be open only upon location of said ice mold means in said upwardly slanted position and so as to be closed upon location of said ice mold means in said horizontal and downwardly slanted positions, force-exerting means operable to effect the ejection of ice cubes from said ice mold means upon the latter being located in said downwardly slanted position, electric motor means located in one of said chambers of said base structure and operatively connected to said blower means and said force-exerting means for driving the same, and means for warming said supply means and said valve means to prevent the freezing of any water therein.

2. In an apparatus according to claim 1; said ice mold means comprising an elongated multi-pocketed tray, said tray being pivotally mounted at one longitudinal edge thereof, said force-exerting means comprising rotatable cam means mounted for engagement with at least one adjunct of said tray at the other longitudinal edge thereof, whereby said tray is moved to said downwardly slanted position by said cam means, and abutment means located in the path of movement of and engageable with said tray from below, said abutment means acting to oppose the movement of said tray under the force of said cam means.

3. In an apparatus according to claim 2; said tray comprising a frame and a pocket-defining body, said abutment means comprising a rigid bar mounted on said base structure for engagement with said tray frame, and said force-exerting means further comprising an elongated member rockably supported by said tray frame adjacent said other longitudinal edge thereof, a plurality of rigid fingers integral with said member and extending into said pockets, respectively, spring means biasing said member so as to press said fingers against the bottoms of said pockets, and at least one element connected with said member and offset relative to the rocking axis thereof for engagement by said cam means, the latter thereby being operable to raise said fingers and frozen ice cubes out of said pockets.

4. In an apparatus according to claim 3; said frame and said body of said tray being made of metal.

5. In an apparatus according to claim 4; said bar being short and engageable with only one end of said tray frame, said element being arranged adjacent the other end of said tray frame, and both said frame and said body being resiliently deformable so as to enable said tray to be longitudinally twisted as the rotation of said cam means continues past the line of contact between said frame and said bar.

6. In an apparatus according to claim 2; said tray comprising a rigid frame and a pocket-defining body made of resiliently deformable plastic material, said duct means being connected with said tray for movement therewith, that portion of said duct means located below said tray being a rigid structure, stationary back-up means supported by said base structure rearwardly of and below said tray and having a concavely curved bearing surface facing frontwardly of said tray, a plurality of short pipes aligned with said pockets of said tray and extending upwardly from said portion of said duct means, and a roller carried by the bottom of said portion of said duct means and adapted to engage and ride up on said curved bearing surface of said stationary back-up means when said portion of said duct means is moved during the downward pivotal movement of said tray, said stationary back-up means in conjunction with said roller and said pipes constituting said abutment means, whereby when said roller abuts against said stationary back-up means and said tray is forced by said cam means against said pipes, the latter deform said pockets and eject the ice cubes therefrom.

7. In an automatic ice cube freezing and harvesting apparatus adapted to be positioned in the freezer compartment of a refrigerator; a base structure defining a plurality of chambers, ice mold means adapted to contain water to be frozen into ice cubes, means mounting said ice mold means on said base structure for pivotal movement between an upwardly slanted position, a substantially horizontal position and a downwardly slanted position, counterweight means connected with said ice mold means and operable to move said ice mold means when empty to said upwardly slanted position, first duct means terminating in close proximity to said ice mold means above and below the latter, first blower means located in at least one of said chambers for effecting a forced flow of cold air from the bottom of said freezer compartment through said first duct means simultaneously against the top and bottom of said ice mold means for freezing the water in the latter at an accelerated rate, means operable to releasably retain said ice mold mens when filled in said horizontal position thereof until rendered ineffective so as to permit movement of said ice mold means to said downwardly slanted position thereof, supply means for the water to be frozen, valve means controlling the flow of water between said supply means and said ice mold means and responsive to the location of the latter so as to be open only upon location of said ice mold means in said upwardly slanted position and so as to be closed upon location of said ice mold means in said horizontal and downwardly slanted positions, force-exerting means operable to effect the ejection of ice cubes from said ice mold means upon the latter being located in said downwardly slanted position, electric motor means located in a chamber of said base structure which is separate and insulated from the chamber housing said first blower means, second duct means terminating at said valve means and said supply means, and second blower means disposed in the same chamber as said electric motor means for effecting a forced flow of air, taken from the upper regions of said freezer compartment and warmed by the heat given off by said motor means, through said second duct means over said valve means and said supply means to prevent the freezing of any water therein, said electric motor means being operatively connected to said first and second blower means and said force-exerting means for operating the same.

8. In an apparatus according to claim 7; further comprising switch means controlling the energization circuit of said electric motor means, and an actuating element carried by said ice mold means and operable to open said switch means so as to stop said motor means, and thus said blower means and said force-exerting means, only upon said ice mold means being located in said upwardly slanted position thereof.

9. In an apparatus according to claim 7; said supply means comprising a tank removably supported by said base structure above said ice mold means and having at least a hollow bottom wall, said valve means being mounted in said bottom wall of said tank, and said second duct means communicating with the interior of said bottom wall of said tank.

10. In an apparatus according to claim 9; further comprising a bin for receiving ice cubes ejected from said ice mold means, said bin being loosely hooked to the front of said base structure and removable therefrom to permit bodily transfer of an accumulated batch of ice cubes without any handling of the cubes themselves.

11. In an automatic ice cube freezing and harvesting apparatus; resiliently deformable ice mold means adapted to contain water to be frozen into ice cubes, means mounting said ice mold means for pivotal movement between an upwardly slanted position, a substantially horizontal position and a downwardly slanted position, counterweight means connected with said ice mold means and operable to move said ice mold means when empty to said upwardly slanted position, air flow means for effecting a forced flow of cold air over said ice mold means and comprising duct means adapted to discharge said cold air simultaneously against the top and bottom of said ice mold means, means operable to releasably retain said ice mold means when filled in said horizontal position thereof until rendered ineffective so as to permit movement of said ice mold means to said downwardly slanted position thereof, supply means for the water to be frozen, valve means controlling the flow of water between said supply means and said ice mold means and responsive to the location of the latter so as to be open only upon location of said ice mold means in said upwardly slanted position and so as to be closed upon location of said ice mold means in said horizontal and downwardly slanted positions, and means for effecting a deformation of said ice mold means and consequent ejection of ice cubes therefrom upon said ice mold means being located in said downwardly slanted position.

12. In an automatic ice cube freezing and harvesting apparatus; resiliently deformable ice mold means adapted to contain water to be frozen into ice cubes, means mounting said ice mold means for pivotal movement between an upwardly slanted position, a substantially horizontal position and a downwardly slanted position, counterweight means connected with said ice mold means and operable to move said ice mold means when empty to said upwardly slanted position, first air flow means for effecting a forced flow of cold air over said ice mold means and comprising first duct means adapted to discharge said cold air simultaneously against the top and bottom of said ice mold means, means operable to releasably retain said ice mold means when filled in said horizontal position thereof until rendered ineffective so as to permit movement of said ice mold means to said downwardly slanted position thereof, supply means for the water to be frozen, valve means controlling the flow of water between said supply means and said ice mold means and responsive to the location of said ice mold means so as to be open only upon location of said ice mold means in said upwardly slanted position and so as to be closed upon location of said ice mold means in said horizontal and downwardly slanted positions, second air flow means for effecting a forced flow of relatively warm air over said supply means and said valve means to prevent the freezing of any water in the same and comprising second duct means adapted to discharge said warm air directly onto said supply means and said valve means, and means for effecting a deformation of said ice mold means and consequent ejection of ice cubes therefrom upon said ice mold means being located in said downwardly slanted position.

13. In an automatic ice cube freezing and harvesting apparatus; resiliently deformable ice mold means adapted to contain water to be frozen into ice cubes, means mounting said ice mold means for pivotal movement between an upwardly slanted position, a substantially horizontal position and a downwardly slanted position, counterweight means connected with said ice mold means and operable to move said ice mold means when empty to said upwardly slanted position, first air flow means for effecting a forced flow of cold air over said ice mold means and comprising first duct means adapted to discharge said cold air simultaneously against the top and bottom of said ice mold means, first retaining means operable to hold said ice mold means in said upwardly slanted position thereof until rendered ineffective by the filling of said ice mold means with the quantity of water required for freezing a batch of ice cubes so as to permit movement of said ice mold means to said horizontal position thereof, second retaining means operable to releasably hold said ice mold means when filled in said horizontal position thereof until rendered ineffective so as to permit movement of said ice mold means to said downwardly slanted position thereof, supply means for the water to be frozen, valve means controlling the flow of water between said supply means and said ice mold means and responsive to the location of said ice mold means so as to be open only upon location of said ice mold means in said upwardly slanted position and so as to be closed upon location of said ice mold means in said horizontal and downwardly slanted positions, second air flow means for effecting a forced flow of relatively warm air over said supply means and said valve means to prevent the freezing of any water in the same and comprising second duct means adapted to discharge said warm air directly onto said supply means and said valve means, and means for effecting a deformation of said ice mold means and consequent ejection of ice cubes therefrom upon said ice mold means being located in said downwardly slanted position.

14. An ice cube tray, comprising frame means, a water-receiving body secured to said frame means and defining at least one pocket in which water is adapted to be frozen into ice cube form, at least one rigid ejector finger extending into said pocket from one side of said body and contoured in accordance with the contours of the inner surface of said pocket for normal flush surface to surface contact therewith and a member connected to said ejector finger and supported by said frame means for pivotal movement about an axis extending along said side of said body, whereby said ejector finger may be raised relative to said bottom surface of said pocket for ejecting any formed ice cube from said pocket.

15. An ice cube tray, comprising frame means, a water-receiving body secured to said frame means and defining a plurality of side by side pockets in which water is adapted to be frozen into ice cubes, a plurality of rigid ejector fingers extending into said pockets, respectively, from one side of said body and contoured in accordance with the contours of the inner surfaces of said pockets for normal flush surface to surface contact therewith, a member connected to said fingers and supported by said frame means for pivotal movement about an axis extending along said side of said body, and means operable on said member and said fingers for biasing the latter so as to normally lie in contact with said bottom surfaces of said pockets, whereby upon application of pressure to said member to move the same pivotally against the force of said biasing means, said fingers may be raised out of said pockets for ejecting frozen ice cubes therefrom.

16. An ice cube tray according to claim 15, said member comprising a plate integral with said fingers.

17. An ice cube tray according to claim 15, said member comprising a shaft integral with said fingers and from which said fingers extend substantially radially, and a shaft-actuating element integral with said shaft and offset relative to the axis thereof.

18. In an automatic ice cube freezing and harvesting apparatus; an ice cube tray comprising frame means and a water-receiving body secured to said frame means and defining a plurality of side by side pockets in which water is adapted to be frozen into ice cubes, means mounting said tray for angular movement about its longitudinal axis, a plurality of rigid ejector fingers extending into said pockets, respectively, from one side of said body and contoured in accordance with the bottom surfaces of said pockets, a member integral with said fingers and supported by said frame means for pivotal movement about an axis extending substantially parallel to said longitudinal axis of said tray, and means operable on said member and said fingers for biasing the latter so as to normally lie in contact with said bottom surfaces of said pockets, whereby upon application of pressure to said member to move the same pivotally against the force of said biasing means, said fingers may be raised out of said pockets for ejecting frozen ice cubes therefrom.

19. In an automatic ice cube freezing and harvesting apparatus; an ice cube tray comprising frame means and a water-receiving body secured to said frame means and defining a plurality of side by side pockets in which water is adapted to be frozen into ice cubes, means mounting said tray for angular movement about its longitudinal axis, a plurality of rigid ejector fingers extending into said pockets, respectively, from one side of said body and contoured in accordance with the bottom surfaces of said pockets, a member integral with said fingers and supported by said frame means for pivotal movement about an axis substantially parallel to said longitudinal axis of said tray, means operable on said member and said fingers for biasing the same so as to normally position said fingers in contact with said bottom surfaces of said pockets, and means arranged for engagement with said member for effecting a pivotal movement of the same against the force of said biasing means so as to cause said fingers to be raised out of said pockets for ejecting frozen ice cubes therefrom.

20. In an apparatus according to claim 19; at least said body of said tray being made of resiliently deformable metal, and means operable on said tray during angular movement thereof for deforming at least said body to a limited extent, prior to the raising of said fingers, for loosening the cubes in said pockets.

References Cited by the Examiner
UNITED STATES PATENTS

| | | | |
|---|---|---|---|
| 2,717,498 | 9/55 | Shagaloff | 62—71 |
| 2,757,519 | 8/56 | Sampson | 62—71 |
| 2,955,442 | 10/60 | Lowenthal | 62—353 X |
| 2,969,654 | 1/61 | Harle | 62—233 |
| 2,994,206 | 8/61 | Shaw et al. | 62—233 X |

ROBERT A. O'LEARY, *Primary Examiner.*

MEYER PERLIN, *Examiner.*